US010047616B2

(12) United States Patent
Mihalic et al.

(10) Patent No.: US 10,047,616 B2
(45) Date of Patent: Aug. 14, 2018

(54) DIFFUSER FOR A GAS TURBINE

(71) Applicant: Ansaldo Energia Switzerland AG, Baden (CH)

(72) Inventors: Igor Mihalic, Karlovac (HR); Dubravko Laic, Karlovac (HR); Dubravko Krizancic, Draganic (HR); Janko Novosel, Bistra (HR)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 163 days.

(21) Appl. No.: 14/876,854

(22) Filed: Oct. 7, 2015

(65) Prior Publication Data
US 2016/0102567 A1  Apr. 14, 2016

(30) Foreign Application Priority Data
Oct. 10, 2014  (EP) .................... 14188429

(51) Int. Cl.
| F01D 9/04 | (2006.01) |
| F01D 25/28 | (2006.01) |
| F02C 3/04 | (2006.01) |
| F01D 25/24 | (2006.01) |
| F02K 1/80 | (2006.01) |
| F01D 25/26 | (2006.01) |

(52) U.S. Cl.
CPC ............ F01D 9/04 (2013.01); F01D 25/243 (2013.01); F01D 25/246 (2013.01); F01D 25/265 (2013.01); F01D 25/28 (2013.01); F02C 3/04 (2013.01); F02K 1/80 (2013.01); F05D 2220/32 (2013.01); F05D 2230/642 (2013.01); F05D 2240/10 (2013.01); F05D 2260/96 (2013.01)

(58) Field of Classification Search
CPC ........ F01D 9/04; F01D 25/243; F01D 25/246; F01D 25/265; F01D 25/28; F01D 25/30; F02C 7/24; F02K 1/80; F02K 1/822; F05D 2220/32; F05D 2230/642; F05D 2240/10; F05D 2260/36; F05D 2260/96
USPC ................................. 415/196, 197
See application file for complete search history.

(56) References Cited

U.S. PATENT DOCUMENTS

| 4,921,401 A | 5/1990 | Hall et al. | |
| 2014/0003931 A1* | 1/2014 | Bruhwiler | F01D 25/30 415/211.2 |
| 2016/0003193 A1* | 1/2016 | Matsuyama | F01D 25/145 138/149 |

FOREIGN PATENT DOCUMENTS

| DE | 10 2012 112 867 A1 | 6/2014 |
| EP | 2 679 780 A1 | 1/2014 |
| WO | 88/09458 A2 | 12/1988 |
| WO | 2014/136514 A1 | 9/2012 |

OTHER PUBLICATIONS

The extended European Search Report dated Feb. 25, 2016, by the European Patent Office in corresponding European Application No. 15186654.8. (6 pages).

* cited by examiner

Primary Examiner — Logan Kraft
Assistant Examiner — Peter T Hrubiec
(74) Attorney, Agent, or Firm — Buchanan Ingersoll & Rooney PC

(57) ABSTRACT

A diffuser for a gas turbine including a support structure and a liner connected by holders. The liner includes a plurality of adjacent segments with overlapping borders. The overlapping borders are clamped to one another and slidingly rest one above the other.

20 Claims, 4 Drawing Sheets

DIFFUSER FOR A GAS TURBINE

CROSS-REFERENCE TO RELATED APPLICATIONS

This application claims priority to EP Application 14188429.6 filed Oct. 10, 2014, the contents of which are hereby incorporated in its entirety.

TECHNICAL FIELD

The present invention relates to a diffuser for a gas turbine.

BACKGROUND

Gas turbines have a compressor where air is compressed, a combustion chamber where a fuel is injected and is combusted with the compressed air generating hot gas, and a turbine where the hot gas is expanded. Downstream of the turbine a diffuser is typically provided to expand and guide the exhaust gas to a stack or to further treatments or to additional components of the plant.

EP 2 679 780 discloses a diffuser; the diffuser has a support structure, insulation and a liner. The liner is made by a plurality of segments that are connected to the support structure and have overlapping borders. Each segment is fixed to one holder in turn connected to the support structure; additional holders are slidingly connected to the segments and are fixed to the holders; this way the segments are supported by the support structure via the holders, but thermal expansion is not prevented.

The overlapping borders are not fixed together, for this reason hot gas pulsations or other gas turbine excitation (e.g. vibration of the structure of the gas turbine) can cause vibration of the liner segments and, in particular, vibration of the overlapping borders. Vibration can cause hammering wear of the overlapping borders with opening of gaps between segments and loss of liner segment pieces.

SUMMARY

An aspect of the invention includes providing a diffuser having a liner whose overlapping borders cannot vibrate one against the other, such that the risk of hammering wear is reduced.

These and further aspects are attained by providing a diffuser for a gas turbine in accordance with the accompanying claims.

BRIEF DESCRIPTION OF THE DRAWINGS

Further characteristics and advantages will be more apparent from the description of a preferred but non-exclusive embodiment of the diffuser, illustrated by way of non-limiting example in the accompanying drawings, in which.

DETAILED DESCRIPTION

Figure 1:
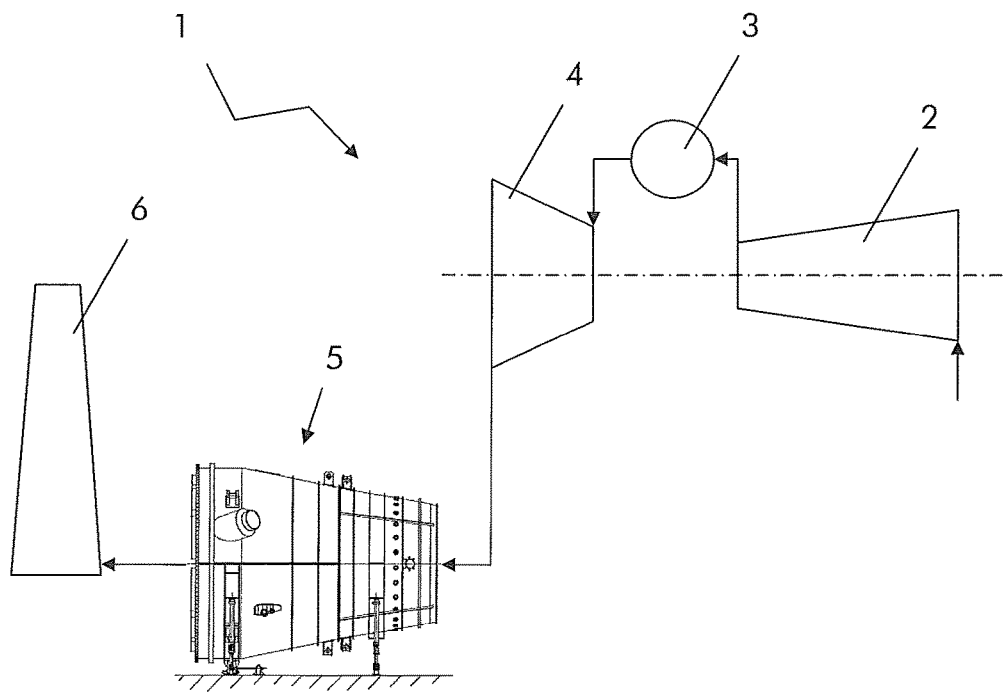
FIG. 1 shows a gas turbine with a diffuser.

FIG. 1 schematically shows a gas turbine 1 with a compressor 2 for compressing air, a combustion chamber 3 for combusting a fuel with the compressed air generating hot gas, and a turbine 4 for expanding the hot gas. The exhaust gas discharged from the turbine 4 is then forwarded to the diffuser 5 for expansion and to a stack 6.

Figure 2:
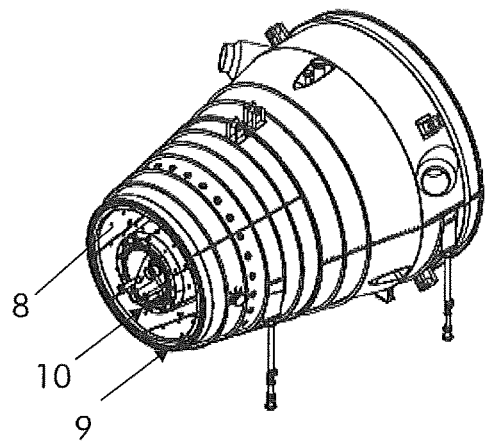
FIG. 2 shows a diffuser for a gas turbine.
Figure 3:
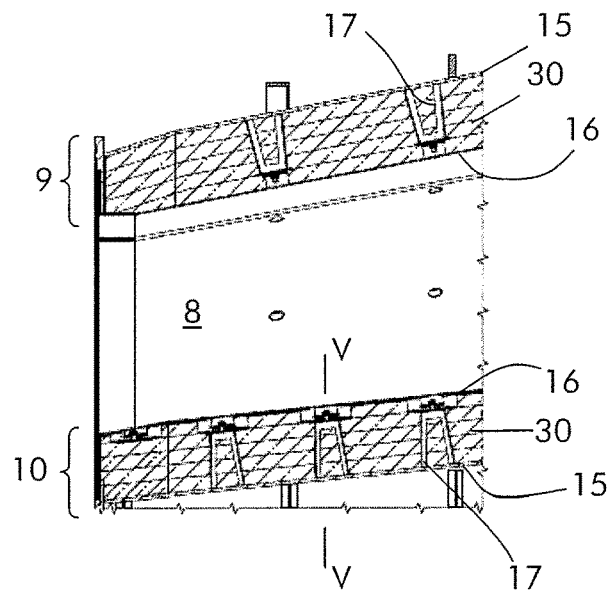
FIG. 3 shows a longitudinal section of a diffuser.

The diffuser 5 is for example shown in FIG. 2; it has an annular channel 8 for the exhaust gas defined by an external wall 9 and an internal wall 10; the external wall 9 and the internal wall 10 preferably have a substantially conical shape.

The external wall 9 and the internal wall 10 can have a similar structure, but this is not mandatory. In the following specific reference to the internal wall 10 is made, it is anyhow clear that the following description applies also to the external wall 9 when the external wall 9 and the internal wall 10 have similar structure; in addition in case the external wall 9 and the external wall 10 have different structure, the following description can apply to either the external wall 9 or the internal wall 10.

The internal wall 10 has a support structure 15 and a liner 16 connected by holders 17. Insulation 30 is provided between the support structure 15 and the liner 16. The liner comprises a plurality of adjacent segments with overlapping borders 16a, 16b.

The overlapping borders 16a, 16b are clamped to one another and slidingly rest one above the other. The overlapping borders 16a, 16b are clamped to the holders 17 and preferably for each couple (pair) 18 of overlapping borders 16a, 16b, each single border 16a, 16b is clamped to the holders 17.

Advantageously, each single border 16a, 16b is clamped to the holder 17 in a sliding fashion over a surface 19a, 19b parallel to the overlapping borders 16a, 16b.

The single borders 16a, 16b have a holding element 20a, 20b extending towards the support structure 15. The holding elements 20a, 20b have an opening 21 and the holders 17 pass through the openings 21 and are connected to the holding element 20a, 20b.

In particular, the openings 21 have a size larger than the external size of a part of the holder 17 passing through them; this allows a play and adaptation to thermal expansion.

Figure 4:
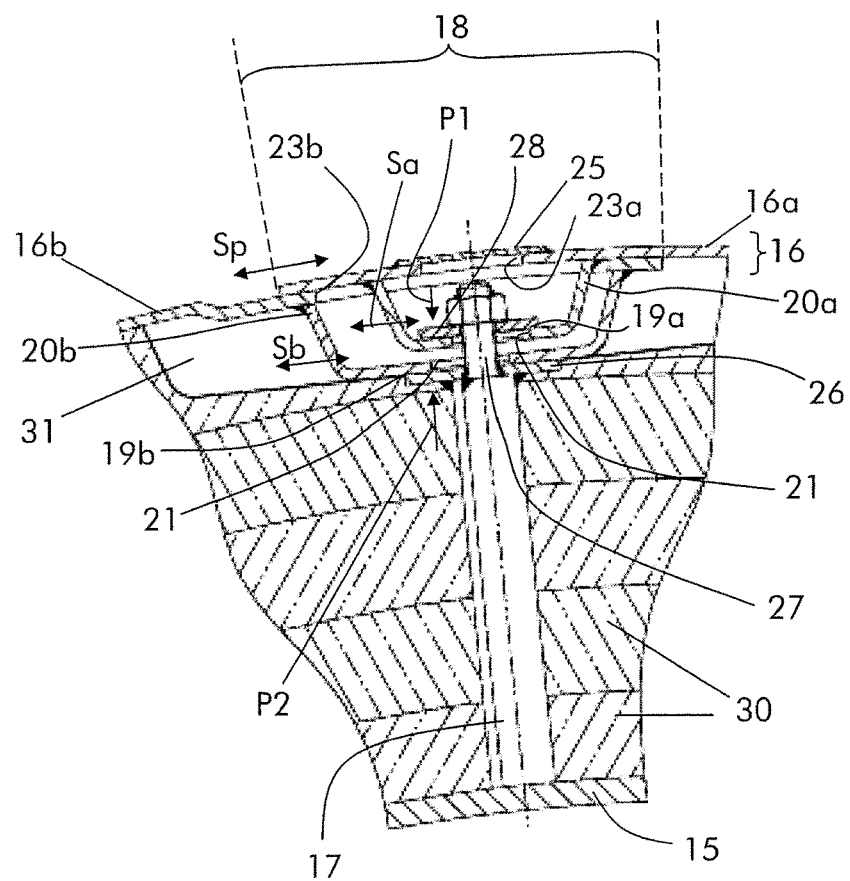
FIG. 4 shows a section over line IV-IV of FIG. 5.
Figure 5:
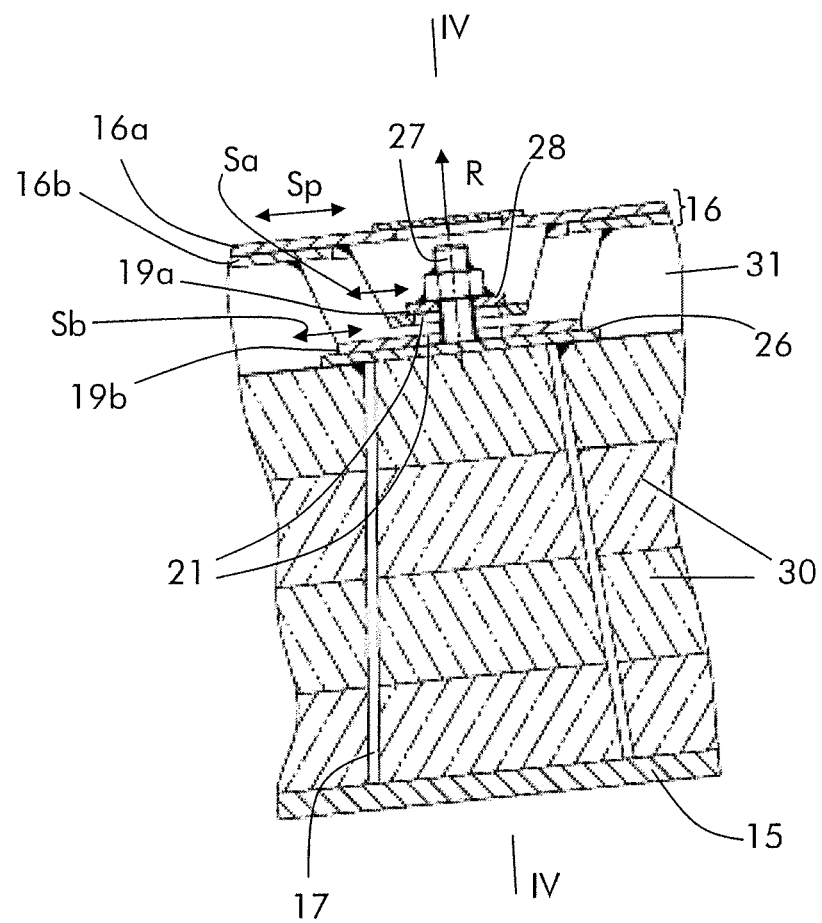
FIG. 5 shows a section over line V-V of FIG. 3.

The holding elements 20a, 20b have a concave shape and each couple 18 of overlapping borders 16a, 16b has a first holding element 20a housed within a second holding element 20b, with the first and second holding elements 20a, 20b apart (spaced apart, see for example FIG. 4) from one another.

In addition, single borders 16a, 16b of couples 18 of overlapping borders have overlapping openings 23a, 23b.

In particular, in a couple 18 of overlapping borders 16a, 16b the opening 23b of a single border 16b is covered by the other single border 16a and the opening 23a of the other single border 16a is covered by a cover 25.

The holders 17 have an elongated shape and for example they can be defined by V-elements with arms fixed to the support structure 15; the opposite part of the holders 17 has a transversal plate 26 fixed to the V-element, with a rod or screw 27 extending from the transversal plate 26. An additional transversal plate 28 is connected and held in position for example by a bolt and/or weld.

The holding elements 20a, 20b slidingly rest on the transversal plates 26, 28, and are located between the transversal plates 26, 28.

The holding elements 20a, 20b are advantageously housed in a cut out 31 of the insulation 30.

Figure 6:
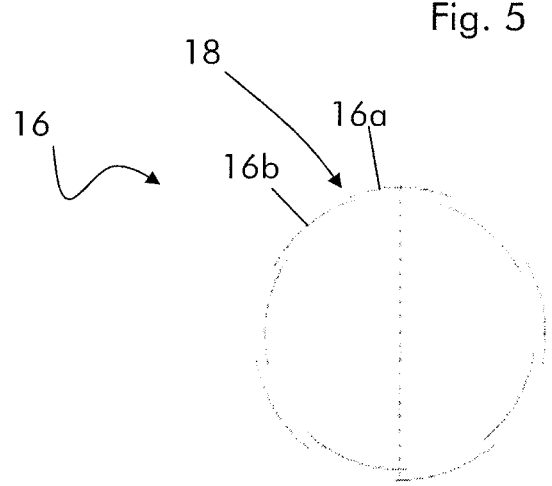
FIG. 6 shows an example of liner segment arrangement.

The segments can be arranged in different ways to define the liner 16, such that any of their borders can face the exhaust gas passing through the channel 8; for example some segments can have both borders exposed to the exhaust gas while others have no borders exposed to the exhaust gas; alternatively all segments can have only one of the borders exposed to the exhaust gas; any combination between the above described examples is anyhow possible or also other combinations are possible; for example FIG. 6 shows one such possibility for the arrangement of the segments in order to define the liner 16.

Figure 7:
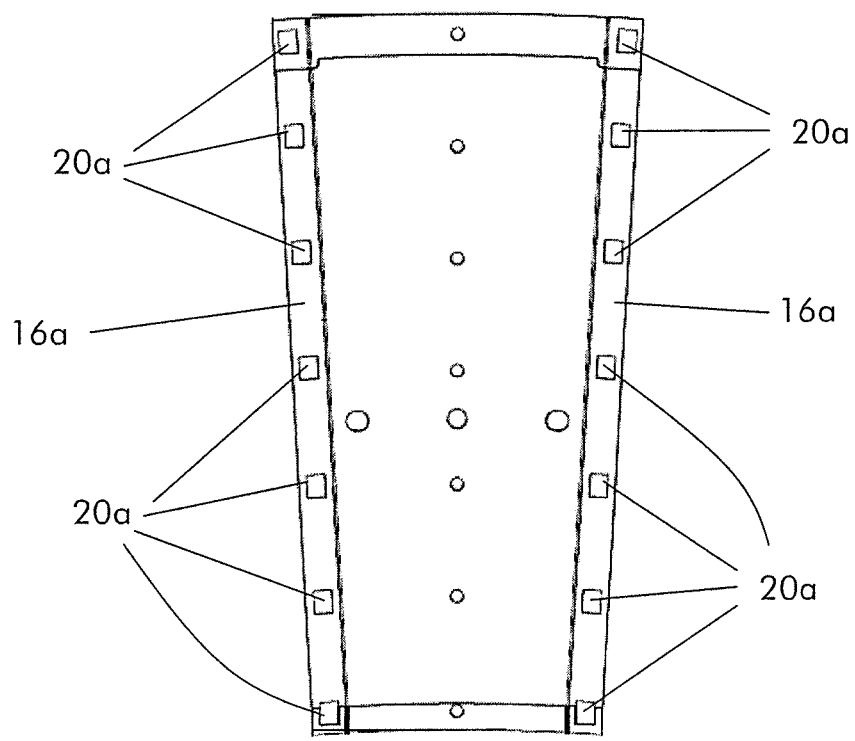
FIGS. 7 and 8 show a top view and a side view of a liner segment.
Figure 8:
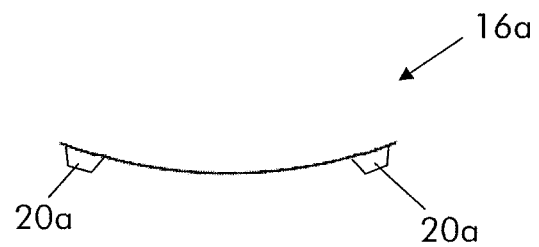

FIGS. 7 and 8 show one possible embodiment of a segment of the liner 16; this segment has the holding elements 20*a* extending both from the same side.

The operation of the diffuser is apparent from that described and illustrated and is substantially the following.

During operation exhaust gas passes through the diffuser; since the overlapping borders 16*a*, 16*b* of the segments are clamped, i.e. they cannot move over a radial axis R one respect to the other, no relative vibration of overlapping borders 16*a*, 16*b* can occur such that hammering wear is substantially reduced. With reference to the Figures, it can be seen that a given border (16*a*) and an overlapping border (16*b*) adjacent to it are clamped to one another and can slide relative to one another in a circumferential direction (perpendicular to the direction of the radial axis (R)). A given border (16*a*) and an overlapping border (16*b*) adjacent to it overlap so that they are above one another in the direction of the radial axis (R)

In addition, the connection also allows sliding of the overlapping borders 16*a*, 16*b* with respect to one another and also with respect to the holders 17; this allows adaptation to thermal deformations.

In fact, the holding element 20*a* of the border 16*a* is slidingly connected to the transversal plate 28 and is pushed towards the support structure 15 as indicated by the arrow P1. Likewise, the holding border 20*b* of the border 16*b* is slidingly connected to the transversal plate 26 and is pushed towards the liner 16 as indicated by the arrow P2. For this reason the overlapping borders 16*a* and 16*b* are pushed one towards the other preventing their separation.

In addition, since the openings 21 of the holding elements 16*a* and 16*b* are larger than the screw 27 of the holder 17, there is a play between the screw 27 and the borders of the openings 21. This play allows sliding of the holding element 20*b* on the transversal plate 26 as indicated by the arrow Sb and likewise sliding of the holding element 20*a* on the transversal plate 28 as indicated by the arrow Sa. Consequently the overlapping borders 16*a*, 16*b* can slide one over the other, as indicated by the arrow Sp.

Naturally the features described may be independently provided from one another.

In practice the materials used and the dimensions can be chosen at will according to requirements and to the state of the art.

The invention claimed is:

1. A diffuser for a gas turbine comprising:
a support structure;
a liner connected by fasteners to a plurality of holders, each holder and fastener arranged entirely below an exterior surface of the liner, the liner including a plurality of adjacent segments with overlapping borders clamped to one another and slidingly resting one above the other, wherein the overlapping borders are clamped to the plurality of holders, for each pair of overlapping borders, each border is clamped to a holder of the plurality of holders, and each border is clamped to the holder in a sliding fashion over a surface parallel to the overlapping borders.

2. The diffuser according to claim 1, wherein the borders each have a holding element extending towards the support structure, each holding element having an opening, the holder passing through the openings and being connected to each holding element.

3. The diffuser according to claim 2, wherein the openings have a size larger than an external size of a portion of the holder passing through them.

4. The diffuser according to claim 3, wherein each holding element has a concave shape.

5. The diffuser according to claim 2, wherein pairs of overlapping borders have a first holding element housed within a second holding element, the first and second holding elements being spaced apart from one another.

6. The diffuser according to claim 2, wherein borders have overlapping openings.

7. The diffuser according to claim 6, wherein in pairs of overlapping borders, one overlapping opening of a border is covered by the other border and the overlapping opening of the other border is covered by a cover.

8. The diffuser according to claim 2, wherein the holders have an elongated shape with transversal plates, wherein for pairs of overlapping borders, each holding element slidingly rests on a transversal plate, and the holding elements are located between the transversal plates.

9. The diffuser according to claim 2, comprising:
a cut out wherein each holding element is housed.

10. The diffuser according to claim 1, comprising:
insulation provided between the support structure and the liner.

11. A gas turbine, comprising:
a diffuser according to claim 1;
a turbine upstream of the diffuser;
a combustion chamber upstream of the turbine; and
a compressor upstream of the combustion chamber.

12. A diffuser for a gas turbine comprising:
a support structure;
a liner connected by a plurality of holders, the liner including a plurality of adjacent segments with overlapping borders clamped to one another and slidingly resting one above the other,
wherein for each pair of overlapping borders, each border is clamped to a holder of the plurality of holders,
the borders each have a holding element extending towards the support structure, each holding element having an opening, the holder passing through the openings and being connected to the holding element, and
each holding element has a concave shape.

13. A gas turbine, comprising:
a diffuser according to claim 12;
a turbine upstream of the diffuser;
a combustion chamber upstream of the turbine; and
a compressor upstream of the combustion chamber.

14. The diffuser according to claim 12, wherein each border is clamped to the holder in a sliding fashion over a surface parallel to the overlapping borders.

15. The diffuser according to claim 12, wherein the openings have a size larger than an external size of a portion of the holder passing through them.

16. The diffuser according to claim 12, wherein the overlapping borders are clamped to the plurality of holders, for each pair of overlapping borders, each border is clamped to a holder of the plurality of holders, the borders each have a holding element extending towards the support structure, each holding element having an opening, the holder passing through the openings and being connected to each holding element, and the holders have an elongated shape with transversal plates, wherein for pairs of overlapping borders, each holding element slidingly rests on a transversal plate, and the holding elements are located between the transversal plates.

17. A diffuser for a gas turbine comprising:
a support structure;
a liner connected by a plurality of holders, the liner including a plurality of adjacent segments with overlapping borders clamped to one another and slidingly resting one above the other,
wherein for each pair of overlapping borders, each border is clamped to a holder of the plurality of holders,
the borders each have a holding element extending towards the support structure, each holding element having an opening, the holder passing through the openings and being connected to the holding element, and
pairs of overlapping borders have a first holding element housed within a second holding element, the first and second holding elements being spaced apart from one another.

18. A gas turbine, comprising:
a diffuser according to claim 17;
a turbine upstream of the diffuser;
a combustion chamber upstream of the turbine; and
a compressor upstream of the combustion chamber.

19. The diffuser according to claim 17, wherein the overlapping borders are clamped to the plurality of holders, for each pair of overlapping borders, each border is clamped to a holder of the plurality of holders, the borders each have a holding element extending towards the support structure, each holding element having an opening, the holder passing through the openings and being connected to each holding element, and the holders have an elongated shape with transversal plates, wherein for pairs of overlapping borders, each holding element slidingly rests on a transversal plate, and the holding elements are located between the transversal plates.

20. The diffuser according to claim 17, wherein the openings have a size larger than an external size of a portion of the holder passing through them.

\* \* \* \* \*